United States Patent [19]
Aziz et al.

[11] Patent Number: 6,018,721
[45] Date of Patent: Jan. 25, 2000

[54] METHOD AND SYSTEM FOR IMPROVED COLLATERAL MONITORING AND CONTROL

[75] Inventors: Kishwer Aziz, New Malden, United Kingdom; Alan Schneider, Maplewood, N.J.; David Schreier, Verona, N.J.; Terence Boyle, Middletown, N.J.

[73] Assignee: Citibank, N.A., New York, N.Y.

[21] Appl. No.: 08/858,655

[22] Filed: May 19, 1997

Related U.S. Application Data

[60] Provisional application No. 60/019,035, May 20, 1996.

[51] Int. Cl.$^7$ ..................................................... G06F 17/00
[52] U.S. Cl. ................................ 705/35; 705/36; 705/37; 705/38
[58] Field of Search ................................ 705/30, 35, 36, 705/37, 38, 32

[56] References Cited

U.S. PATENT DOCUMENTS

| | | | |
|---|---|---|---|
| 4,376,978 | 3/1983 | Musmanno et al. | 705/35 |
| 4,713,761 | 12/1987 | Sharpe et al. | 364/406 |
| 4,953,085 | 8/1990 | Atkins . | |
| 5,262,942 | 11/1993 | Earle . | |
| 5,644,727 | 7/1997 | Atkins . | |
| 5,802,499 | 9/1998 | Sampson et al. . | |
| 5,835,899 | 11/1998 | Rose et al. | 705/34 |
| 5,839,118 | 11/1998 | Ryan et al. | 705/36 |
| 5,864,828 | 1/1999 | Atkins | 705/36 |

OTHER PUBLICATIONS

Ensor Benjamin, Cedel launches collateral service, Global Investor, pp. 1–2, Oct. 1996.
Fegan John, Burning down the electronic sueperhighway, International Security Lending, pp. 4–12, 1995.
Rubin et al, Public versus private markets, Real estate Finance, pp. 1–4, 1996.

*Primary Examiner*—James P. Trammell
*Assistant Examiner*—Mussie Tesfamariam
*Attorney, Agent, or Firm*—Kramer Levin Naftalis & Frankel LLP

[57] ABSTRACT

A system and method is provided for advanced multi-currency collateral monitoring and controlling for use in a variety of businesses. The system maintains portfolios of collateral accounts and liability information. It supports transaction processing whether by manual input or SWIFT messaging. The system has the ability to apply acceptance rules in determining whether a security purchase by a client is of a sufficient quality as to have collateral value. Additionally, the system may hold-up or prevent a security sale based upon insufficient collateral remaining in the client's accounts. Tables, preferably located in a relational database are included within the system for assessing the risk associated with holding securities of a particular type, and the risk associated with holding securities in currencies other than the liability currency.

34 Claims, 13 Drawing Sheets

AS PER OUR SECURITY AGREEMENT DATED OCTOBER 1, 1991 (OUR REFERENCE 123456), BANK IS PROVIDING YOU WITH A MARGIN CALL NOTICE, THE DETAILS OF WHICH ARE DOCUMENTED BELOW:

| NOTIFICATION DATE | DUE DATE | DUE AMOUNT | CONFIRMED PLEDGES | AS OF DATE | BALANCE DUE | FAIL IND. |
|---|---|---|---|---|---|---|
| | | | | | | |

THE AMOUNT OF THIS MARGIN CALL IS $_____ , IN (BANK'S   YOUR) FAVOR.
THE TOTAL MARGIN WHICH IS DUE OR PAST DUE IS $_____ .
THE AMOUNT CURRENTLY PLEDGED BY (BANK, YOURSELVES) IS $_____ .

| CALL NOTICE PROCESSING | | | | | | p7c4r5 |
|---|---|---|---|---|---|---|
| PREVIOUS | NEXT | PRINT | | TABLE | REFRESH | EXIT |

FIG. 5A

| | | |
|---|---|---|
| CMM TRADE INITIATION | | p6c3r5 |
| REFERENCE DATA | | |

| | |
|---|---|
| SENDER SWIFT ID: ▣ | TRANS TYPE ▣ |
| RECEIVER SWIFT ID: ▣ | SUB TYPE ▣ |
| TRANSACTION REF: | |
| RELATED REF: | |

| TRANSACTION DETAIL | |
|---|---|
| TRADE DATE: | DELIVERY DATE: |
| SEC ISIN: ▣ | CUSTODY BANK: |
| SEC SHORT NAME: | CUST ACC'T NO: |
| SECURITY TYPE: | F/C/T: |
| SECURITY CCY: | F/C/T: |
| QUANTITY: | |
| SETTLEMENT AMT: | |
| SETTLEMENT CCY: | |
| PAYMENT ACC'T: | |

| PREVIOUS | | NEXT | | VERIFY | | EXIT |
|---|---|---|---|---|---|---|

CCM TRANSACTION MASTER     p5c5r4

CLIENT NAME:     GC CID:

MARGIN AGREEMENT NO:     FILE NAME:

| PROD PROC | PRODUCT | TRANSACTION ID | B/S | CCY 1/CCY2 | TRADE DATE | MAT DATE | NOTIONAL(USD) | IM %AMT | IM(USD) | CMTM(USD) | V |
|---|---|---|---|---|---|---|---|---|---|---|---|
| | | | | | | | | | | | |

| PREVIOUS | NEXT IO | ADD | | DELETE | | VERIFY | | SAVE TEMP | EXIT |
|---|---|---|---|---|---|---|---|---|---|

FIG. 5D

| ADD MARGIN AGREEMENT TEMPLATE | | p2c4r5 |
|---|---|---|

CLIENT AGREEMENT PROFILE

CLIENT SHORT NAME:  　　　　　　　　AGREEMENT NO:
CLIENT LEGAL NAME:  　　　　　　　　AGREEMENT TYPE: ◉
GFCID:  　　　　　　　　　　　　　　EFFECT DATA:
BUSINESS USE:  　　　　　　　　　　　ACC'T OPEN DATA:
STATUS:  　　　　　　　　　　　　　　VALUATION AGENT: ◉
　　　　　　　　　　　　　　　　　　AGREEMENT FORM: ◉

CLIENT AGREEMENT PARAMETERS

| THRESHOLD AMOUNT: | OR % OF NOTIONAL | DOWNGRADE PROV: |
|---|---|---|

INITIAL MARGIN IND:
INITIAL MARGIN AMOUNT:　　OR % OF NOTIONAL　　RATING:

| | | S & P: | ◉ |
|---|---|---|---|
| VAL DATE TOPUP AMT: | OR % OF IM: | MOODY: | ◉ |
| INTERIM VAL TOPUP AMT: | OR % OF IM: | OTHER 1: | ◉ |
| CMTM TOPUP AMT: | OR % OF IM: | OTHER 2: | ◉ |

MINIMUM CALL AMOUNT:
INTERIM CALL AMOUNT:　　　ROUNDING AMOUNT:

BANK AGREEMENT PARAMETERS

| THRESHOLD AMOUNT: | OR % OF NOTIONAL | DOWNGRADE PROV: |
|---|---|---|

INITIAL MARGIN IND:
INITIAL MARGIN AMT:　　　OR % OF NOTIONAL　　RATING:

| | | S & P: | ◉ |
|---|---|---|---|
| VAL DATE TOPUP AMT: | OR % OF IM: | MOODY: | ◉ |
| INTERIM VAL TOPUP AMT: | OR % OF IM: | OTHER 1: | ◉ |
| CMTM TOPUP AMT: | OR % OF IM: | OTHER 2: | ◉ |

MINIMUM CALL AMOUNT:
INTERIM CALL AMOUNT:　　　ROUNDING AMOUNT:

AGREEMENT PARAMETERS-TIMING

FREQUENCY: ◉
VALUATION DATE 1:　　　　　VALUATION TIME:
VALUATION DATE 2:
NOTIFICATION DAYS:　　　　NOTIFICATION TIME:
TRANSFER/SUBSTITUTION DAYS:　ROLL CONVENTION: ◉

AGREEMENT PARAMETERS-COLLATERAL RULES

◉ ACCEPTABILITY TABLE　　　　CASH INTEREST RATE:
◉ COLLATERAL GROUP TABLE　　INTEREST PAYMENT DATE:
　　　　　　　　　　　　　　　APPLY INTEREST/DIV INDICATOR:
　　　　　　　　　　　　　　　REHYPOTHECATION ELIG IND:

| PREVIOUS | | TABLES | | NEXT | | | EXIT |
|---|---|---|---|---|---|---|---|

| ADD CLIENT TEMPLATE | | plc6r5 |
|---|---|---|
| CLIENT PROFILE | | |
| CLIENT SHORT NAME:<br>GFPID:<br>GFCID:<br>CLIENT LEGAL NAME:<br>ADDRESS:<br>ADDRESS:<br>CITY:                    STATE/COUNTRY:<br>                              ZIP:<br><br>PRIMARY CONTACT:       CMU CONTACT:<br>TELEPHONE:             NOTICE TEL NO:<br>FAX NUMBER:            NOTICE FAX NO: | | AGREEMENT NO:<br>EFFECT. DATE:<br>ACC'T OPEN DATE: |
| RELATIONSHIP CONTACTS | | |
| CONTROL UNIT CONTACT:       REL. MANAGER<br>CU TEL NO:                  REL. TEL NO. | | |
| CCMP REFERENCES | | |
| CMU NAME:                      PREFER'D RATINGS:<br>BUS. USE CODE:  ▣           PREFER'D PRICE:<br>COLL. GRP CODE:                REPORT MEDIA:<br>REPORT CCY:     ▣ | | |
| CUSTODY REFERENCES | | |
| CASH SWIFT ADDRESS:<br>ACCOUNT NO:<br>CASH CCY:  ▣<br>WIRE INSTRUCTIONS 1:<br>WIRE INSTRUCTIONS 2:<br><br>SEC SWIFT ADDRESS:<br>ACCOUNT NO:<br>SECURITY CCY:  ▣<br>WIRE INSTRUCTIONS 1:<br>WIRE INSTRUCTIONS 2: | | CASH SWIFT ADDRESS:<br>ACCOUNT NO:<br>CASH CCY:  ▣<br>WIRE INSTRUCTIONS 1:<br>WIRE INSTRUCTIONS 2:<br><br>SEC SWIFT ADDRESS:<br>ACCOUNT NO:<br>SECURITY CCY: ▣<br>WIRE INSTRUCTIONS 1:<br>WIRE INSTRUCTIONS 2: |
| PREVIOUS | NEXT | TABLES | EXIT |

*FIG. 5E*

METHOD AND SYSTEM FOR IMPROVED COLLATERAL MONITORING AND CONTROL

CROSS-REFERENCE TO RELATED APPLICATIONS

The present application claims the benefit of U.S. Provisional Application Ser. No. 60/019,035, filed May 20, 1996.

BACKGROUND OF THE INVENTION

This invention relates to a method and system for improved collateral monitoring and control and, more particularly, to a computerized system which automatically receives transaction messages, reviews account information, and determines whether sufficient collateral is provided in accounts in view of risk considerations associated with the collateral, investments and currencies.

There are many computerized systems on the market today used in banks, securities firms, and the like. For example, U.S. Pat. No. 4,346,442, entitled Security Brokerage-Cash Management System, was assigned to Merrill Lynch, Pierce, Fenner & Smith Inc. of New York and issued in 1982. This patent is directed to an early cash management system which used data processing to improve securities brokerage/cash management supervision. It allows the financial services firm to provide for automatic investment of free credit cash balances in interest bearing accounts, so that an investor that has free cash in his/her investment account automatically receives appropriate interest payments.

U.S. Pat. No. 5,262,942 entitled Financial Transaction Network is directed to a financial network for maintaining a number of mutual fund portfolios operating in different currencies. The host processor acts as a communications switch validating incoming transaction requests and routing them to a central transfer agent system for execution. The host processor maintains central records that can be queried through the host.

U.S. Pat. No. 4,713,761 entitled System for Centralized Processing of Accounting and Payment Functions is directed to a computer implemented system for determining and accounting for the cost of transactions. The system particularly determines and accounts for the cost of shipping goods. The system requirements include an input device which is located at a shippers location and a central data processing facility. In other words, this system tracks expenses as well as products.

U.S. Pat. No. 5,025,373 entitled Portable Personal-Banking System is directed to a portable personal banking system comprising a host computer and at least one portable terminal among a variety of terminals including automatic teller machines and personal computers. The portable terminal provides a range of banking services over an automatic dial-up telephone connection to the host bank computer. The personal terminal comprises a keyboard and display capability with minimal key requirements and display capacities. This patent deals with concerns regarding remote computers versus bank servers and issues of capability and access.

In today's global marketplace, banks, financial institutions, securities firms, insurance companies and other financial institutions must be concerned with maintaining appropriate collateral for securing loans and the like. Each institution sets up its own lending requirements, and collateral needs for each of its customers. However, in today's global marketplace, the collateral may depreciate in value faster than the repayment of loaned funds; for example, if a loan in U.S. dollars is being secured against a foreign security, the foreign security could depreciate in dollar terms by a decrease in price of the security, or a decrease in the foreign currency value against the U.S. dollar. Accordingly, it is desirable to provide a collateral management tool that controls and tracks collateral against liabilities and can be used to determine whether or not to extend margin against securities or other products such as derivatives, tri-party agencies and insurance letters of credit.

SUMMARY OF THE INVENTION

The present invention provides a system and method for the management and tracking of collateral using a computer system. The system and method accesses a plurality of databases which are preferably relational databases to allow for the following collateral processing actions: validation of an account's existence within the system; the validation of the securities' existence within the system; retrieval of all confirmed and unconfirmed account positions effecting available collateral for the account and an account in its collateral group; retrieval of the account's security, cross-currency haircut and acceptability tables; the validation of the securities' acceptability by its depository, class, tenor and rating in the acceptable table; the retrieval of all threshold and minimum call information for the account; calculation of the optimal haircut application by multiplying the security haircut table by the cross-currency haircut table and sorting the resulting figures and currency security class pairs in descending order; the calculation of the local market value for each position and proposed position; the conversion of the market values to U.S. dollars, retaining an indicator of the local currency; applying security haircuts to the resulting U.S. dollar market values; retrieving collateral requirements (resulting from liabilities) in the U.S. dollar, grouped by originating currency; matching of like currency collateral to collateral requirements; matching remaining requirements to remaining collateral by finding the highest currency/security class pair in the remainders and working down the optimization list; and applying minimum calls or thresholds and reporting any remaining shortfalls.

Taken together, the foregoing collateral processing method validates that the collateral in an account satisfies requirements based on acceptability rules; determines if the movement creates a shortfall; and provides approval or rejection processes to manage the transaction message through the acceptance and settlement cycle.

The front end of the system is defined by a plurality of personal computers running a graphic user interface (GUI). The back end of the system, which handles the processing, is a client/server based network designed to communicate with the personal computers over conventional telecommunication lines. The personal computers communicate over a network to a message router, which receives all incoming requests and data and forwards them to the appropriate server. The message router also communicates with a switch which enables it to transmit data and requests to SWIFT and to custody systems such as COSMOS and SECORE, and to receive data and requests from them.

Accordingly, it is an object of the present invention to provide an efficient intra-day, paperless collateral movement and control processing system.

It is an additional object of the invention to provide a system and method that produces on-line client statements to avoid report production and delivery.

Another object of the invention is to allow for the performance of real-time collateral position, valuation, shortfall and acceptability checks, thereby permitting tighter haircuts, reduced risk exposure, and more competitive pricing.

Still another object of the invention is to provide enhanced security, such as requiring dual signatures for most operations, such as creating tables and entering collateral movement instructions.

Still another object of the invention is to allow enhanced user control over the system by allowing users to set up a variety of rules and haircuts, based on client/counterparty agreements, to control the movement of collateral, such as acceptability rules, shortfall rules, security haircuts, and cross-currency haircuts. The system automatically blocks all collateral movement that does not meet the criteria specified in the rules and haircuts.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5A is an exemplary screen printout for a notification letter indicating a margin call;

FIG. 5B is an exemplary screen printout of a trade initiation form for entering trade data into a computerized system in accordance with the present invention;

FIG. 5C is a transaction master template for use in the present invention;

FIG. 5D is a template for adding a margin agreement into the collateral monitoring and control system in accordance with the present invention;

FIG. 5E is a template for adding an additional client into the collateral monitoring and control system in accordance with the present invention;

DETAILED DESCRIPTION OF THE PREFERRED EMBODIMENTS

Figure 1:
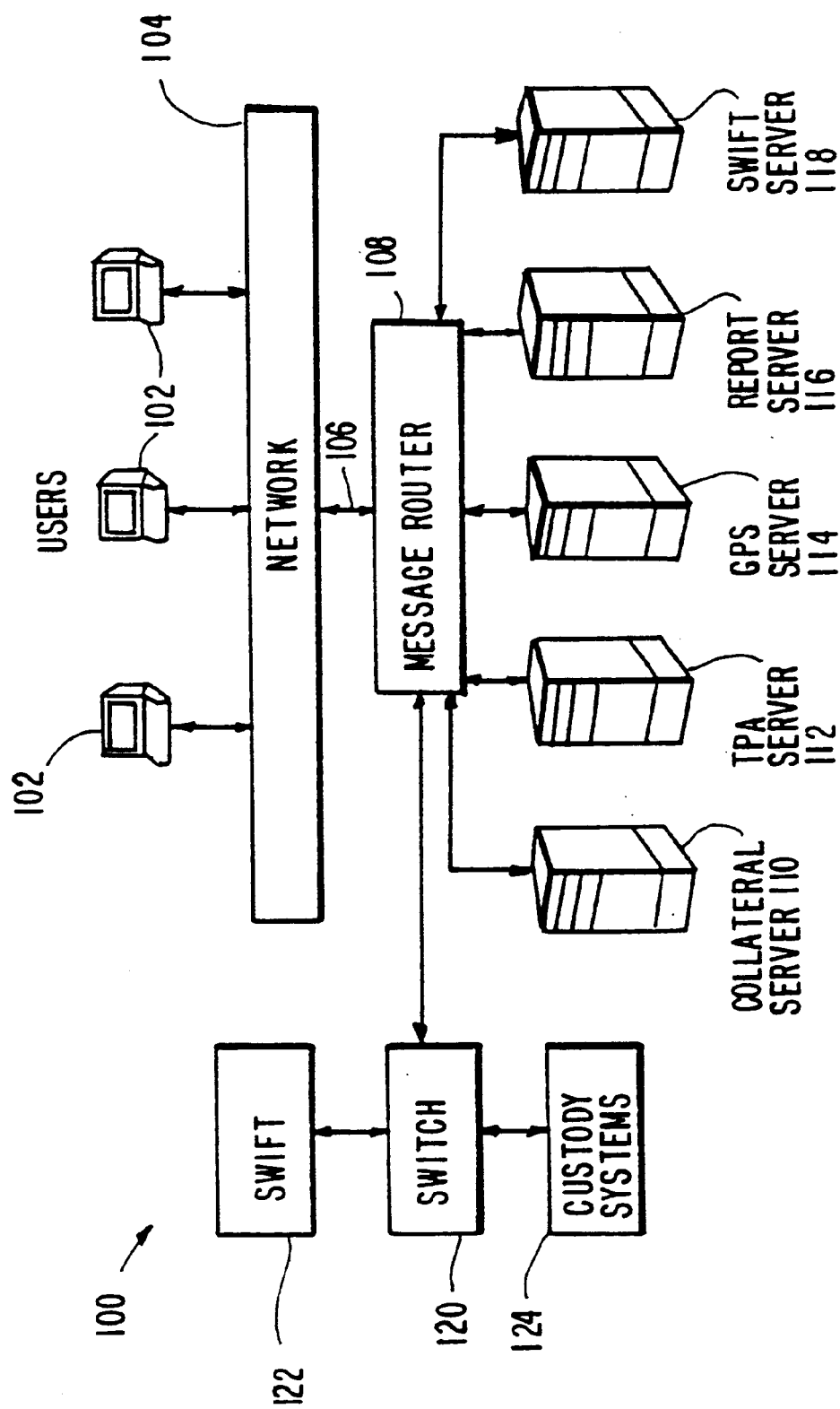
FIG. 1 is a block diagram of a collateral monitoring and control system in accordance with the present invention.

Reference is now made to the figures, which illustrate a system and method in accordance with the present invention. With particular reference to FIG. 1, a collateral monitoring and control system, generally indicated at 100, constructed in accordance with the instant invention, is depicted. System 100 includes a plurality of user interfaces 102 running a GUI. In the preferred embodiment, user interfaces 102 are personal computers that run on, for example, the windows operating system by Microsoft Corporation. This is the front end of system 100. User interfaces 102 are coupled to network 104 which is preferably a local area network. Network 104 is electronically coupled via communication lines 106 to message router 108. Message router 108 is coupled to a plurality of servers including collateral server 110, TPA server 112 (tri-party agreement), GPS server 114, report server 116 and swift server 118.

Message router 108 is also electrically coupled to switch 120 via conventional telecommunication lines or the like. Switch 120 is coupled to SWIFT 122. Switch 120 is also coupled to custody system 124.

Referring generally to FIG. 1, system 100 is accessed by users via user interfaces 102. User interfaces 102 are networked via a local area network or a wide area network. The network is preferably a Novell Ethernet. Message router 108 receives all incoming requests and data and forwards them to the appropriate server 110–118. The router also communicates with switch 120 which transmits data and requests to SWIFT 122 and custody systems 124. Message router 108 is preferably a router network with routing capability at locations where servers are located; for example, in a global network separate routing capability is provided on each continent where servers are located. Custody systems 124 could include COSMOS, a cash custodial system in London, or SECORE, a securities custodial system also in London.

Figure 2:
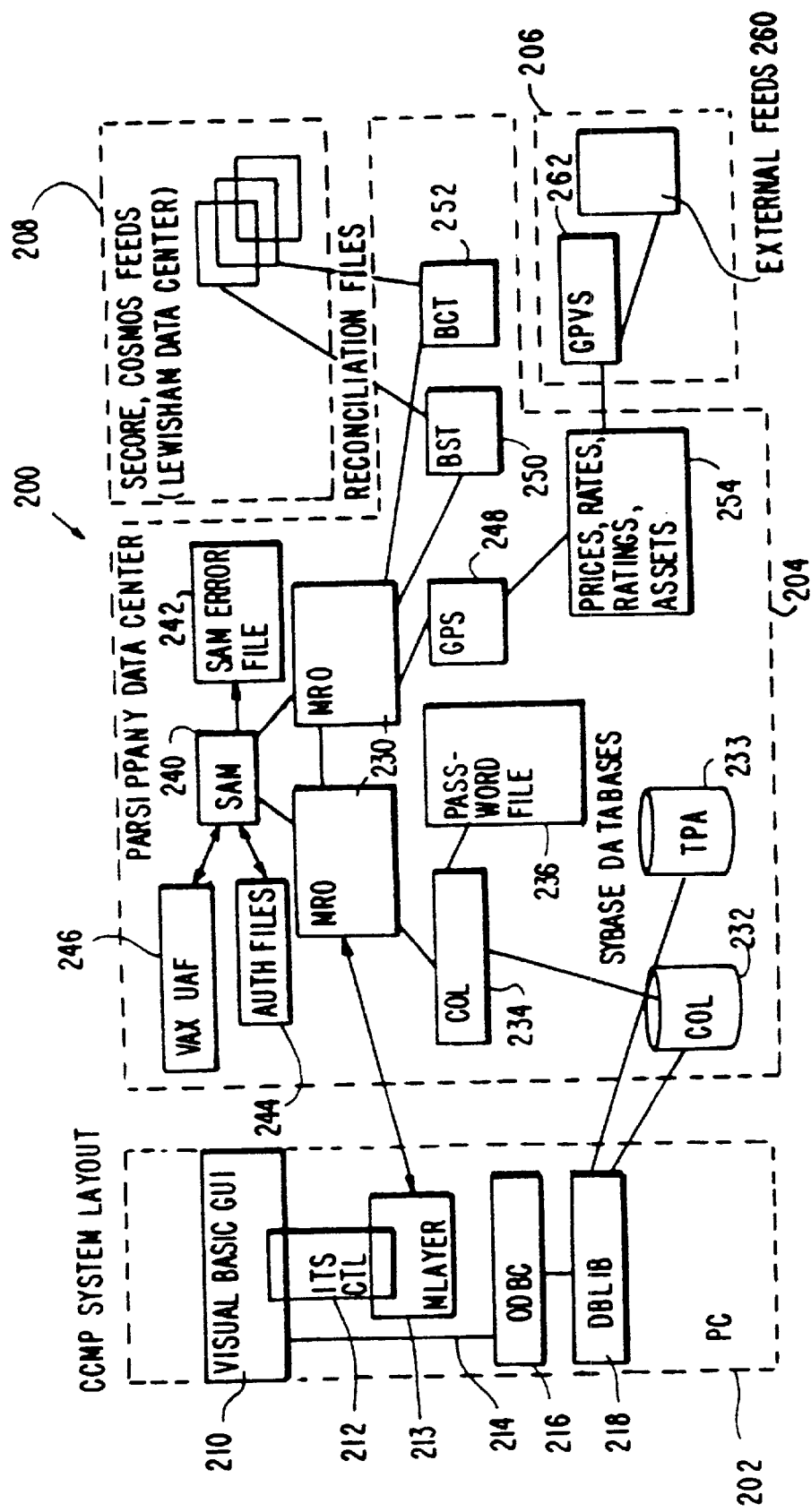
FIG. 2 is a detailed block diagram illustrating the system layout of a collateral monitoring and control system in accordance with the present invention.

Particular reference is next directed to FIG. 2 which is a block diagram illustrating a system layout. Collateral monitoring and control system, generally indicated at 200, includes four main parts, a front end system 202, a data processing system 204, a portfolio valuation system 206 and a reconciliation system 208. Front end system 202, portfolio valuation system 206 and reconciliation system 208 are each coupled to data processing system 204.

Front end system 202 includes visual basic GUI 210 which sits upon an ITS platform 212. Visual basic GUI 210 is also electrically coupled via wire 214 to open database connectivity 216. Open database connectivity 216 is electrically coupled to database library 218.

Front end system 202 is coupled to data processing system 204 via two separate links. Firstly, visual basic GUI 210 is coupled to message routers 230 via ITS platform 212 and Mlayer 213. (Note that two message routers 230 are illustrated; however, additional message routers may be required depending upon the size of the application.) Additionally, database library 218 is directly coupled to collateral database 232 and tri-party agreement database 233.

Data processing system 204 receives inputs from the user via message router 230 and collateral database 232. Collateral database 232 is electrically coupled to collateral product server 234 which is in turn electrically coupled to message router 230. Additionally, collateral product server 234 is electrically coupled to password file 236. Password file 236 must be in a similar format to the various databases. In the preferred embodiment, the databases use Sybase technology.

Message routers 230 are also electrically coupled to security manager 240. Security manager 240 is coupled to security manager error file 242, authorization file 244 and VAX UAF 246. The message routers 230 are also electrically coupled to GPS batch server 248, BST batch server 250 and BCT batch server 252. BST batch server 250 and BCT batch server 252 are each electrically coupled to reconciliation system 208. Alternatively, GPS batch server 248 is electrically coupled to portfolio valuations system 206 through prices, rates, rating, assets 254.

Reconciliation system 208 receives data feeds such as SECORE which are forwarded to BST batch server 250 and COSMOS feeds forwarded to BCT batch server 252. SECORE and COSMOS are securities custodial systems provided in London and are preferred systems for use in the present invention. The process of reconciliation is generally one wherein records are sent to the collateral server and the collateral server reads the SECORE position information and compares with its own security positions. If a difference is found, then a report is sent to a report file. The report file also has information on non-zero security positions that were not on the reconciliation file, and positions on the reconciliation file that were not found in data processing system 204. A report is automatically printed at the end of the reconciliation process.

Finally, an external feed 260 is received from a service such as Extel or Muller which is forwarded to a valuation system 262 which is then forwarded to prices, rates, ratings, assets 254.

Speaking more generally of system 200, it is based upon the ITS platform and open database connectivity 216. The ITS component 212 is responsible for system security, report requests, and all batch server communications. Open database connectivity 216 is responsible for all database operations between front end system 202 and the servers.

Implementation of the ITS messaging architecture requires a plurality of servers communicating using a number of message routers 230. The network connection between the servers (i.e., collateral server 234, GPS batch server 248, BST batch server 250 and BCT batch server 252) and the message routers 230 enables the ITS system to be distributed over a number of VAX processors. The servers perform their computation tasks according to messages received from their adjacent message router. The server transmits the results back to the user, or onto the next server using the same message router network. Communication is prohibited between servers other than through the message routers. Each server is a single VAX process, or a collection of VAX processes that performs a specific task within the ITS system. Preferably, there are plural ITS servers functioning as batch servers. All batch servers feed external information to the collateral server during nightly batch processing. The GPS batch server moves securities information, including prices and exchange rates to and from portfolio valuation system 206. Portfolio valuation system 206 is responsible for receiving prices and exchange rates from external feeds 260. Securities are loaded from the system security master on a daily basis.

Open database connectivity 216 allows most client server communication to bypass the ITS server, and channel traffic directly to the databases via database library 218. The client application thus establishes three server connections: one to the message router 230, one to collateral database 232 and another database connection to tri-party database 233.

Figure 3:
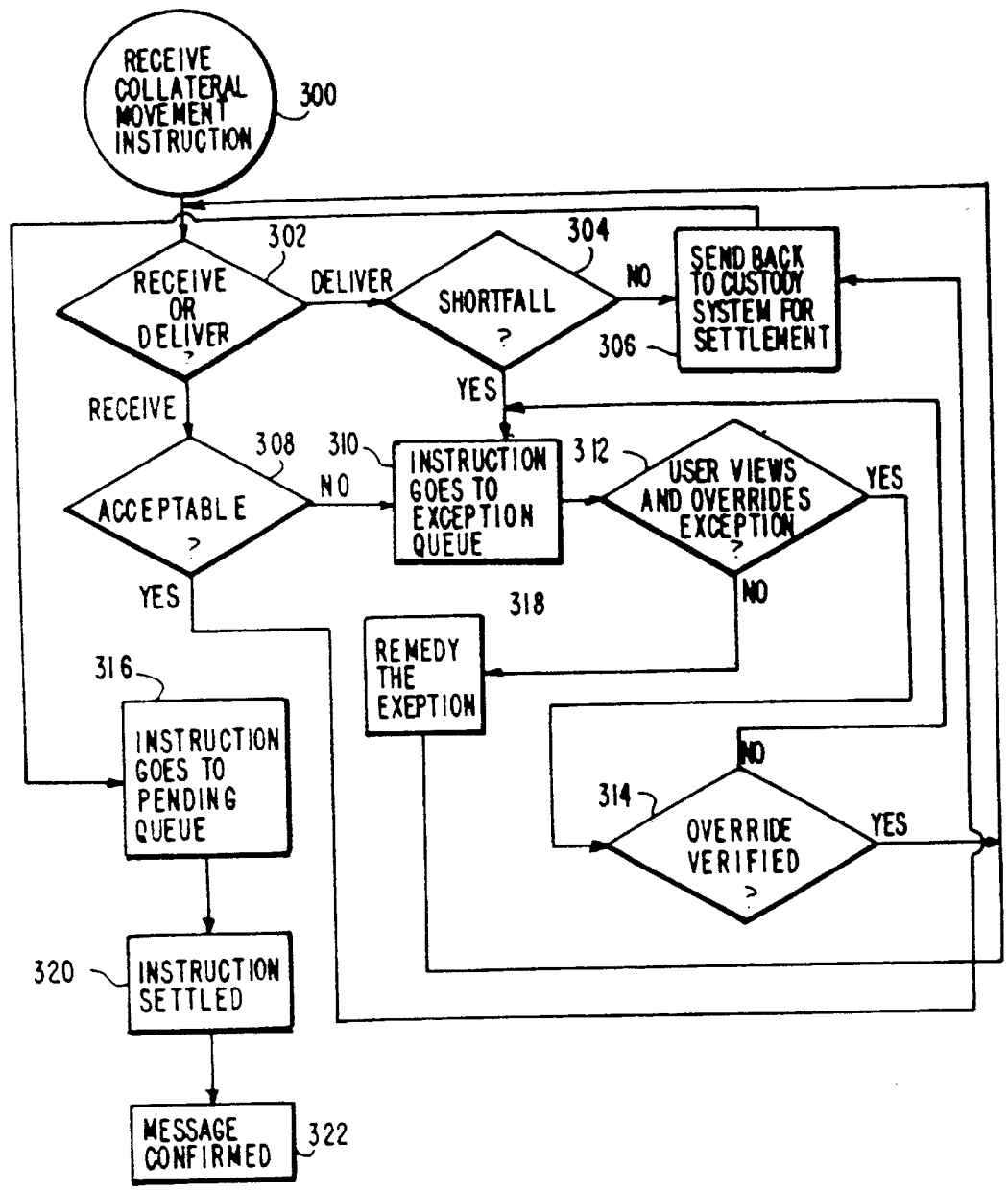
FIG. 3 is a flowchart illustrating an overview of the collateral processing methodology in accordance with the present invention.

Particular reference is next directed to FIG. 3 which is a flowchart illustrating the collateral processing methodology.

The process begins at block 300 with the receipt of a collateral movement instruction. The process then proceeds to decision block 302 and asks whether the collateral movement instruction is a receive or deliver. If the instruction in block 300 is a deliver, then the process moves from decision block 302 to decision block 304 and checks whether there is a shortfall. If there is no shortfall, decision block 304 issues a "no" response and proceeds to block 306. Block 306 causes the process to send back the collateral movement to the custody system for settlement. The process then proceeds to block 316 where an instruction goes to the pending queue. The process then proceeds to block 320 when the instruction is settled and proceeds to block 322 to confirm message.

Alternatively, if the instruction is a collateral receipt in block 300, the process moves from decision block 302 to decision block 308 and asks whether the receipt is acceptable. If the receipt is acceptable, a "yes" response in decision block 308, the process proceeds to block 306 and sends back the collateral movement instruction to the custody system for settlement. Then the process moves to block 316 through 322 as described above.

If the response in block 308 is "no" that the received collateral is determined unacceptable, the process moves to block 310. Additionally, if a shortfall is found in block 304, a "yes" response, the process proceeds to block 310 and an instruction is sent to the exception queue. The process then proceeds to decision block 312 and asks whether a user view or override exception is desired. If a "no" response is received in block 312, the process proceeds to block 318 and the exception is remedied. The process then proceeds back to decision block 302. Alternatively, if a "yes" response is received in decision block 312, the process proceeds to decision block 314 and asks whether the override is verified. If the override is verified, a "yes" response, the process proceeds to decision block 302. Alternatively, if the override is not verified, a "no" response in decision block 314, the process returns to block 310 as described above.

More generally, FIG. 3 illustrates that the system receives collateral movement messages 300 from a number of product and custodial systems throughout the organization in which it is employed. First a determination is made whether the message is receive or deliver collateral in decision block 302. If the message is to receive collateral, a determination must be made whether it is acceptable in decision block 308. If it is acceptable, it goes to the pending queue in block 316 and a release message is sent to the custody system to permit settlement in block 320. Alternatively, if it is not acceptable, it goes to the exception queue in block 310.

Alternatively, if the collateral movement instruction is to deliver in block 302, first a determination is made whether there is a shortfall in decision block 304. If there is a shortfall, an instruction is sent to the exception queue in block 310. Alternatively, if there is no shortfall, it goes to pending queue in block 316, and a release message is sent to the custody system to permit settlement. In each instance, when an instruction is routed to the exception queue in block 310, the only way it can leave is to remedy the problem that caused the exception or override the exception.

Figure 4:
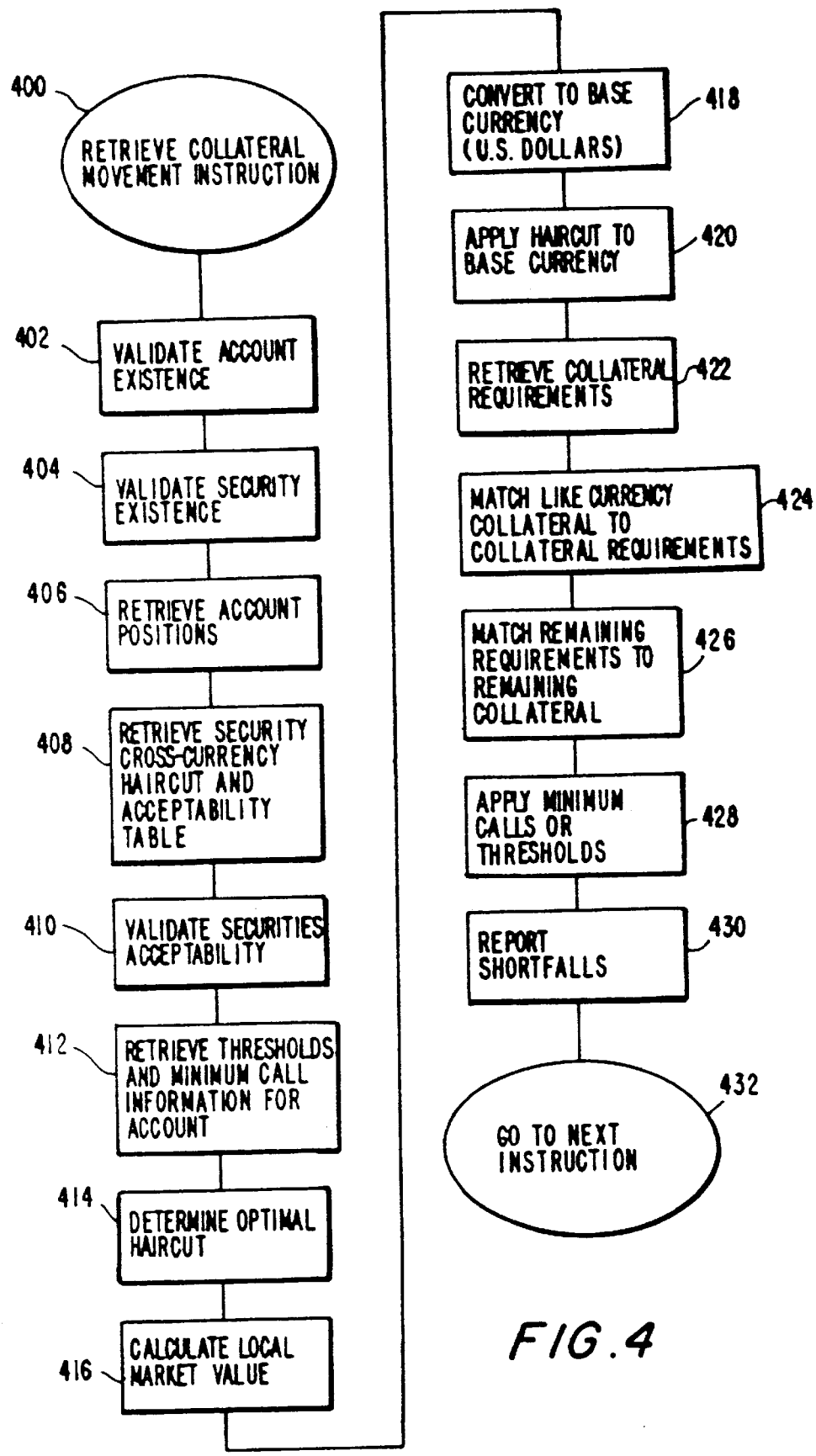
FIG. 4 is a detailed process flow diagram illustrating the steps carried out in a collateral monitoring system in accordance with the present invention.

Particular attention is next directed to FIG. 4 which illustrates the collateral processing actions in greater detail. The process is initiated with a collateral movement instruction at block 400. The process then moves to block 402 and validates the account's existence in the system. After validation of the account in block 402, the process validates the security's existence in the system at block 404. Then, the process moves to block 406 and retrieves all confirmed and unconfirmed account positions affecting available collateral (delivers) for the account and any account in its collateral group. The process next moves to block 408 and retrieves the account's security, cross-currency haircut and acceptability tables. These are tables located in the relational database.

After block 408, the process continues to block 410 and validates the security's acceptability by its depository, class, tenor and rating in the acceptability table (for receive messages). After block 410, the process proceeds to block 412 and retrieves all threshold and minimum call information for the account. The process proceeds to block 414 and finds the optimal haircut application by multiplying the security haircut table by the cross-currency haircut table and sorting the resulting figures and currency security class pairs in descending order.

After block 414, the process proceeds to block 416 and calculates the local market value for each position and proposed position. The local market value is the market value in the country in which the position is held. The process next proceeds to block 418 and converts the local market value to the base currency. For a U.S. company, the base currency will preferably be U.S. dollars. However, an indicator must be maintained of the local currency. In block 420, a security haircut is applied to the resulting base currency market value. The process then proceeds to block 422 and retrieves collateral requirements (resulting from liabilities) in the base currency, grouped by originating currency. The process then proceeds to block 424 and matches like currency collateral to collateral requirements. Next the process moves to block 426 and matches the remaining requirements to the remaining collateral by finding the highest currency/security class pair in the remainders and working down the optimizing list.

The process then moves to block 428 and applies minimum calls or thresholds for delivers. Finally, the process moves to block 430 and reports any remaining shortfalls (for delivers). Then in block 432 the process waits for the next instruction or message.

Taken together, the process as disclosed in FIG. 4 validates that the collateral satisfies the requirements based on the acceptability rules. Additionally, the process determines if the movement of collateral creates a shortfall and provides approval or rejection processes to manage the message through the acceptance and settlement cycle.

If any of the processing actions show shortfalls, the message is forwarded for override approval or further monitoring (for future messages that will correct the situation) to the appropriate monitoring group.

In practice, the monitoring group is set up and the computer program gives off an alarm on the screen indicating that a new message requires group attention. The monitoring group is enabled with the ability to retrieve any message requiring consideration at any time. The reviewer can then approve or continue to hold the message for further action.

When the main process requests collateral position retrieval, such as block 406 of FIG. 4, the following information is obtained from the relational databases that are accessed by the process.

Collateral Valuation Information

1. Security identifier
2. Units
3. Price multiplier (price per units indicator)
4. Extender (foreign exchange dominance indicator)
5. Latest exchange rate
6. Security class code
7. Rating
8. Effective maturity date
9. Pricing currency code
10. Unconfirmed-Confirmed indicator
11. Not valid indicator
12. Price
13. Price date The system retrieves the most recent price and price date for all unconfirmed and confirmed security positions within the specified collateral group. The system also retrieves the cash positions of all currencies in the collateral group.

The system then determines available collateral by taking the values of all confirmed positions and subtracting the values of all unconfirmed deliver messages, including the pending message that initiated the valuation request.

When the process calculates the local market value, such as in block 416 of FIG. 4, the system first checks that each position is valid and then performs the following steps:

1. Computing a market price portion as shown below:
   when Price Multiplier Flag equals zero, local market value equals units*extender*price;
   when Price Multiplier Flag equals one, local market value equals units*extender/price;
2. Adding the accrued interest applicable for the appropriate fixed income securities, based upon the account setting for the accrued flag;
3. Converting the market value to the system's base currency (U.S. dollars), using the formula;
   base market value equals local market value (plus accrued)/latest exchange rate.

When applying a security haircut as required by block 420 of FIG. 4, the system retrieves the haircut table for the collateral group being revalued and then takes the following steps:

The system checks whether the position is valid and applies a zero valuation for invalid positions. For all valid positions the system takes the following steps:

1. Calculating the years until maturity by taking the system date and subtracting it from the position's effective maturity date;
2. Retrieving the record in the haircut table containing the position's security class, rating and maturity (if applicable);
3. Using the contents of the record to calculate the position's margin contribution, as shown below:
   when margin type indicator equals P; contribution equals base market value*(1 minus margin);
   when margin type indicator equals E; contribution equals (100*base market value/margin).

When the main process requests the cross-currency haircut as described in block 408 of FIG. 4, after retrieving liability information, the process matches collateral to liabilities, using the currency of the liabilities and the currency of the collateral position. The process performs the match in a manner that minimizes the applied haircut, in order to maximize the collateral margin contribution.

The following example is provided to explain how the match works. The system begins with U.S. dollar liabilities. It matches the confirmed U.S. dollar collateral to the U.S. dollar trade collateral requirements until the margin requirement is met or the U.S. dollar collateral is used. The system then performs the same match for each currency in the liability portfolio against confirmed collateral. Next, the system applies any excess confirmed collateral by currency to any existing requirements from different liability currencies minus the cross-currency haircut. It starts with the cross-currency pair that maximizes the collateral contribution against the liability, as determined by the cross-currency haircuts. When the requirement is met or the confirmed collateral runs out, the system chooses the next most beneficial cross-currency pair to fill the collateral requirement (i.e., the pair that next maximizes the collateral contribution).

The system determines the currency pair that maximizes the collateral contribution by multiplying the percentage decimals for each combination of security class and currency pair in the security and cross-currency haircut tables. It then sorts the figures that result in descending order (least haircut first) and applies collateral in the order determined in the list, selecting the collateral of the currency and class indicated by the pair with the highest percent.

The system tracks the liability margin requirement satisfied by confirmed available collateral and the net contribution margin (risk adjusted value) of the available confirmed collateral. The "available confirmed collateral" is defined as the confirmed collateral position, minus any depending delivery message (including the pending message).

Furthermore, when a receive collateral movement message reaches the system, the system reviews the relevant accounts or collateral group accounts to determine if the concentration limits, as defined in the appropriate acceptability table, have been breached.

If a request of an acceptability check is issuing a report request, the system will retrieve the appropriate acceptability table and all the positions in the associated account. The account will be valued as previously described, and totals for all values under consideration in a table are filled with the collateral contribution values in the accounts for each limit category.

The system also performs a number of shortfall processing actions to determine whether the confirmed collateral held in an account satisfies the collateral requirements, as described by the account's liabilities. The system performs these actions whenever it receives a new pricing that effects existing collateral positions, a deliver or cash withdrawal message, and requests by system report processes that they require these actions.

Shortfall processing requires collateral revaluation, haircut application, cash application, comparison, and reporting. The system retrieves the minimum call amount for the collateral group record. The minimum call is added to the confirmed margin contribution result following haircut application. The total is then used to compare for the shortfall check. The system then subtracts the outstanding liabilities from the total net collateral margin contribution to determine the shortfall. If the result is negative, then a shortfall warning is issued. Alternatively, if the result is zero or greater, then no shortfall exists. Additionally, if the shortfall check was initiated by the receipt of a message, the system will return the results to the initiating process.

Particular reference is next directed to FIGS. 5A–5E which each illustrate exemplary templates or forms generated by the computer system for interacting with the users.

Particularly, FIG. 5A is a form margin call notice that is generated by the system when a banks customer has overextended their margin balance.

FIG. 5B is a trade initiation computer screen in accordance with the present invention which enables a user to enter the appropriate information to begin a message process.

FIG. 5C is a computer screen for the transaction master which indicates all transactions for a particular client under a given margin agreement and file.

FIG. 5D is a template or computer screen for adding a margin agreement to the system. The template illustrates all the required parameters, and each parameter is then stored in an appropriate look-up table of the relational database.

FIG. 5E is yet another exemplary template or computer screen for adding a client to the system. The template indicates the required information for adding a client to the system, and the information input is also added to appropriate tables of the relational database.

Figure 6:
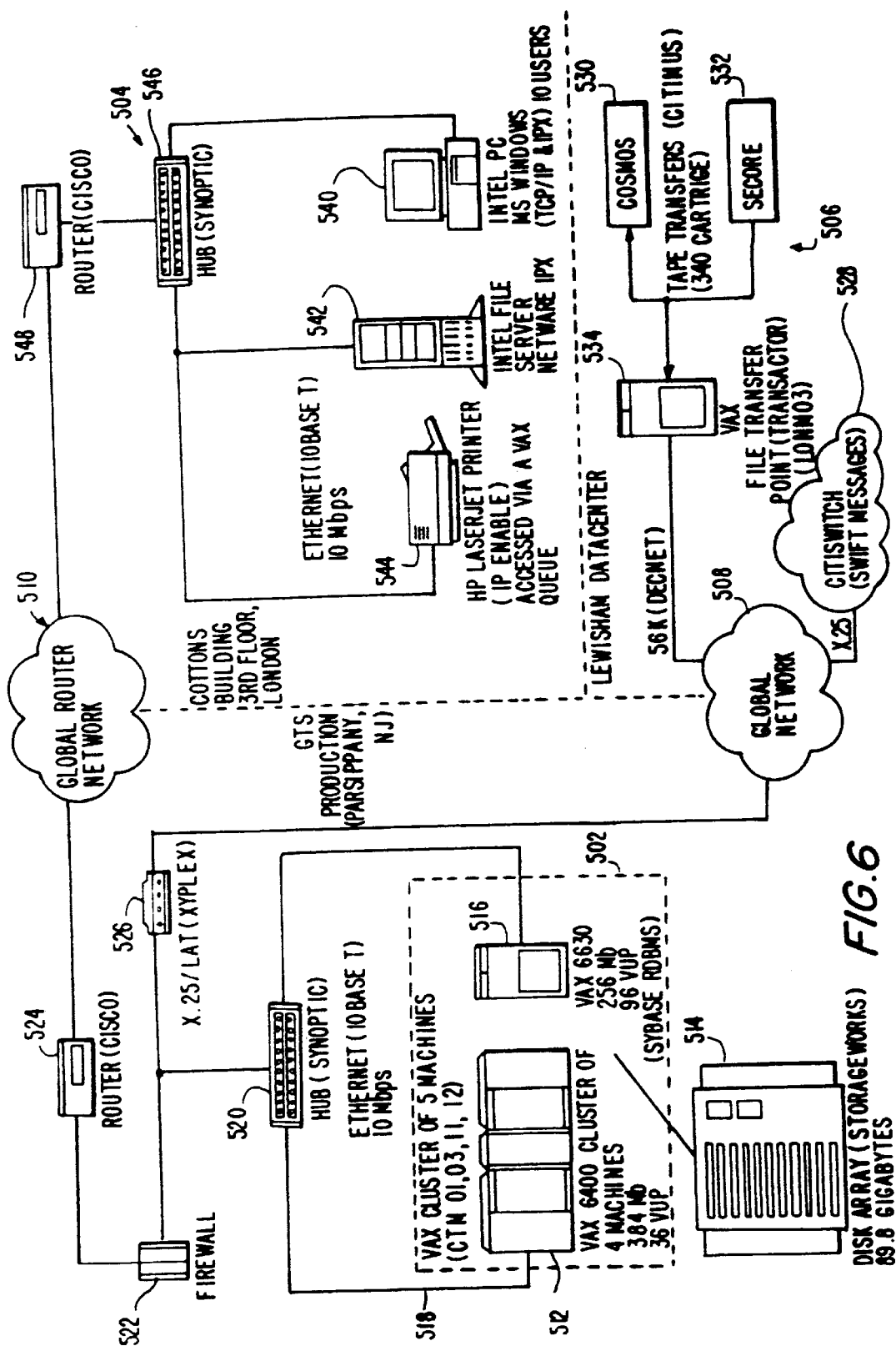
FIG. 6 is a block diagram illustrating a system and network architecture in accordance with the present invention.

Particular reference is next made to FIG. 6 which is a block diagram illustrating the system including the international letter of credit system and network architecture. The architecture is broken up into three main sections which include the main data processing center, generally indicated at 502, a remote user system, generally indicated at 504, and the reconciliation system, generally indicated at 506. Reconciliation system 506 is electrically coupled to data processing center 502 by global network 508 and remote user system 504 is connected to data processing center 502 by global router network 510. In some embodiments, global network 508 and global router network 510 may be the same global router network.

Data processing center 502 includes a VAX cluster 512 which is essentially similar to the servers of FIG. 2 and a disk storage array 514 and a VAX 6630 running a Sybase relational database indicated at reference numeral 516. These units are all electrically coupled via an ethernet indicated at 518 and are electrically coupled to a hub 520. In the preferred embodiment, hub 520 is manufactured by Synoptic. Hub 520 is also coupled to fire wall 522 which is additionally coupled to a router 524 (in the preferred embodiment routers 524 are manufactured by Cisco Systems Inc.). Routers 524 are then coupled to global router network 510. Additionally, hub 520 is coupled to LAT 526 which is electrically coupled to global network 508. Global network 508 is electrically coupled to reconciliation system 506 which includes a switch for receiving and transmitting SWIFT messages 528. Additionally, the COSMOS and SECORE feeds 530, 532 respectively are received and are tape transferred to VAX 534. VAX 534 is also referred to as a transactor. From VAX 534, the reconciliation information is transmitted over global network 508 to data processing center 502.

Remote user system 504 includes a plurality of user interface devices 540 (personal computers), a network file server 542, and a plurality of printers 544. User interface device 540, file server 542 and printers 544 are all electrically coupled via an ethernet and are coupled to a hub 546. Hub 546 is electrically coupled to a router 548 which is additionally connected to global router network 510.

Figure 7:
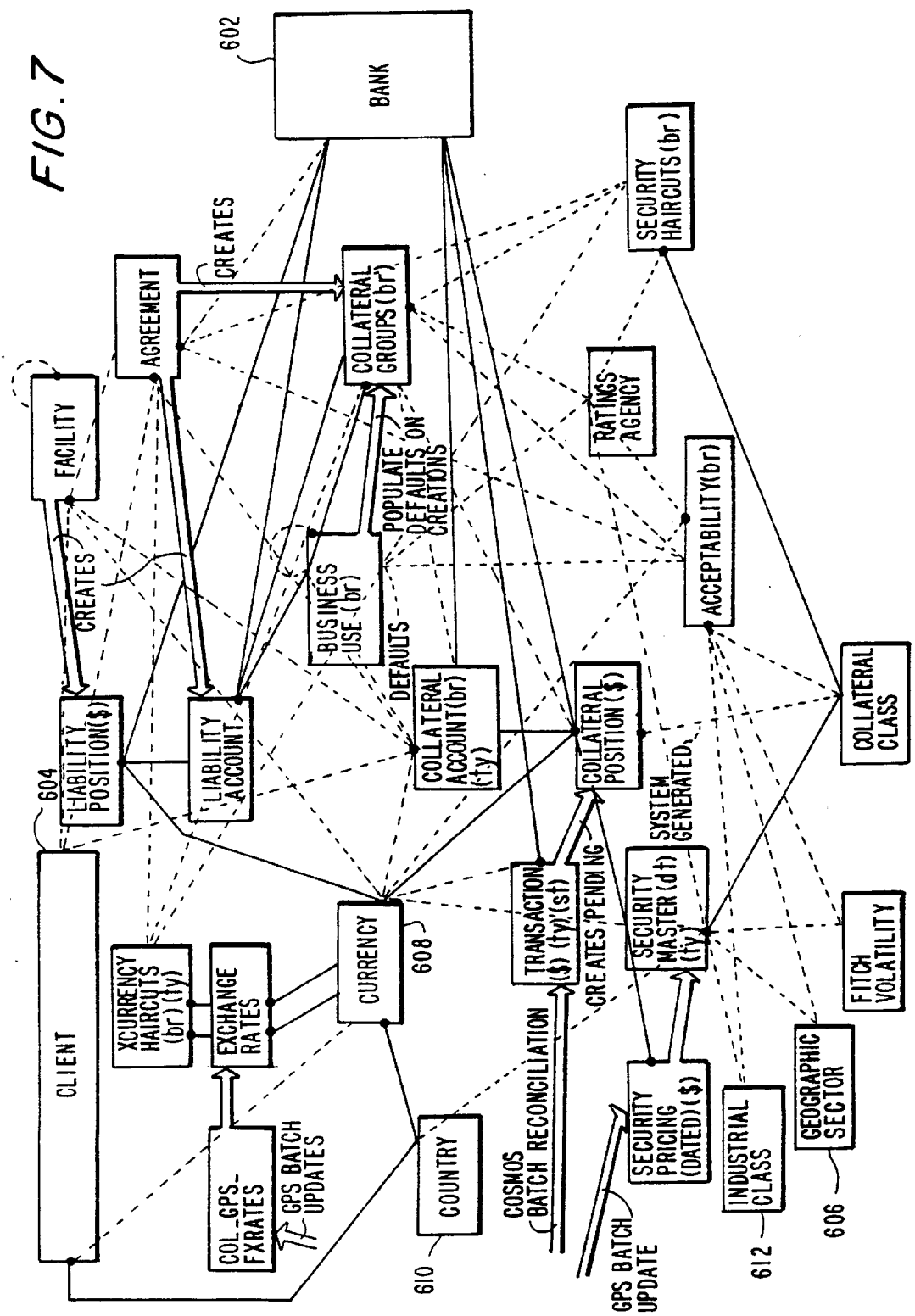
FIG. 7 is an entity relationship and data source diagram in accordance with the present invention.

Particular attention is next directed to FIG. 7 which illustrates an entity relationship and data source diagram. This diagram illustrates the interconnection of the various elements of the collateral monitoring and control system, with the majority of the blocks indicating particular table database entities. Of course, the bank 602 and client 604 represent a lending institution and a client that borrows, respectively. The tables are broken into two types of tables. Single record tables are the simplest tables. They contain a single record with all the information in the table. Geographic sector table 606 is an example of a single record table.

Geographic sector table 606 consists of a single record that includes the code for each geographic region and a brief description of the region. There is no other information in the table. Other examples of single record tables are currency table 608, country table 610, and industrial class table 612.

Multiple record tables contain more information than single record tables. In a multiple record table, the identity of the record must first be identified. This would generally be located in an ID field. The additional records depend upon the type of table and information required.

Figure 8:
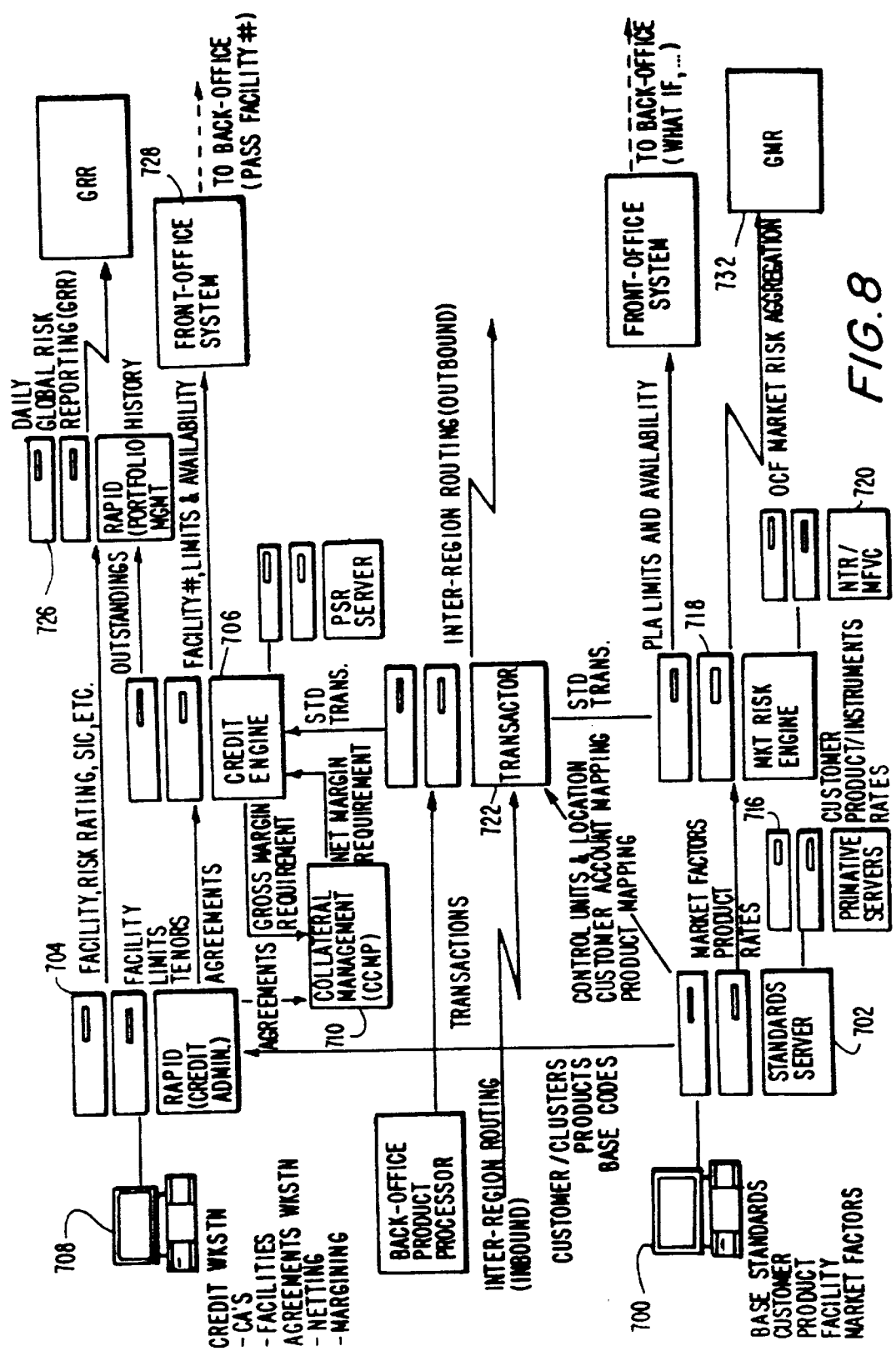
FIG. 8 is a functional flow diagram of a risk information system in accordance with the present invention.

Attention is next directed to FIG. 8 which is a functional flow diagram for the risk information system. It illustrates an overview of risk management in a lending institution. The data flow diagram specifically illustrates where the collateral management component 710 fits within the risk information system. Transactions and account set up information is entered through interface 700 which is electrically coupled to a standards server 702. Standards server 702 is electrically coupled to rapid credit administration 704. Rapid credit administration 704 additionally receives information from credit workstation and agreement workstations through interface 708. New agreements received by rapid credit administration 704 are input into the collateral management system 710. Rapid credit administration 704 then transmits facility, limits, tenors, and agreements to credit engine 706 and transmits facility, risk ratings, SIC, etc. to rapid portfolio management 726. Credit engine 706 in turn transmits information on outstanding issues to rapid portfolio management 726 and credit engine 706 transmits information on facility numbers, limits and availability to front office 728. Collateral management system 710 transacts with credit engine 706 and receives gross margin requirements and transmits net margin requirements. A main transactor 722 (which may be a VAX) communicates with credit engine 706 and market risk engine 718. Market risk engine 718 also receives market factor product rates from standards server 702, and standards server 702 also receives customer product instruments and rate information from server 716. Market risk engine 718 receives additional information from NTR/MFVC server 720, and outputs global management reports 732.

From FIG. 8 it can be seen that the operations of a global institution require all types of risk management. The present invention provides one type of risk management that requires proper collateral in accordance with agreements with clients and continuously updates and manages the collateral taking into account market swings and currency swings to prevent unnecessary risk taking by a lending institution.

Figure 9:
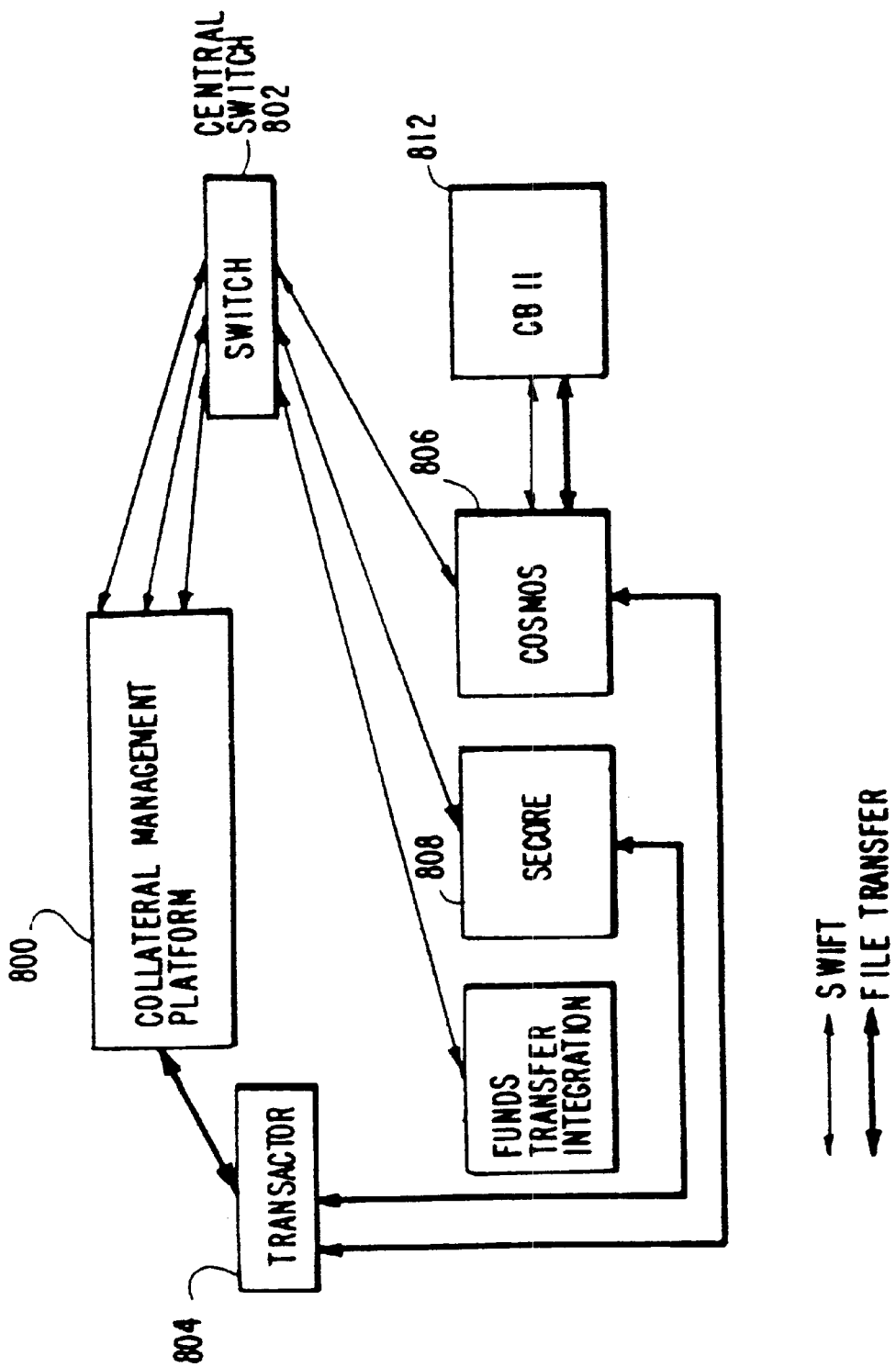
FIG. 9 is a block diagram indicating the links between the collateral monitoring and control system and the remaining system architecture of a lending institution.

FIG. 9 is a block diagram providing an overview of the integrated systems used in a global lending institution. Particularly, FIG. 9 illustrates an overview of the integration of a collateral management platform within the overall network system. A collateral management platform 800 is electrically coupled to a central switch 802. Additionally, the collateral management platform is electrically coupled to a transactor 804 and files are transferred therebetween by file transfer protocol.

Central switch 802 is electrically coupled to the reconciliation function indicated as COSMOS 806 and SECORE 808. COSMOS 806 and SECORE 808 are electrically coupled to transactor 804 and transfer information through file transfer protocol. Additionally, COSMOS 806 transacts with CBII client screen 812. CBII client screen 812 allows clients to review information.

In other words, information passed through central switch 802 is transferred intra-day through the central switch 802 in SWIFT format. Information transferred through transactor 804 is transferred as batch data in ASCII flat-file format.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also understood that the following claims are intended to cover all of the generic and specific features of the invention herein described and all statements of the scope of the invention which, as a matter of language, might be said to fall therebetween.

What is claimed is:

1. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables including a security haircut table and a cross-currency haircut table;

calculating an optimal haircut using at least one of said predetermined tables;

calculating a market value for each collateral position using at least one of said predetermined tables;

applying the optimal haircut to the market value for each collateral position to obtain an adjusted collateral value;

retrieving collateral requirements from at least one of said predetermined account tables for an account;

matching the adjusted collateral value to the collateral requirements on a country-by-country basis;

matching unmatched collateral requirements to unmatched collateral including finding a highest currency security class product among the unmatched collateral; and acting in response thereto.

2. The method of monitoring collateral as claimed in claim 1, including the step of retrieving confirmed and unconfirmed account positions affecting available collateral for the account.

3. The method of monitoring collateral as claimed in claim 1, wherein said predetermined account tables include a security table, a cross-currency haircut table, and an acceptability table.

4. The method of monitoring collateral as claimed in claim 3, wherein said acceptability table includes entries for each security including a depository, a class, a tenor and a rating.

5. The method of monitoring collateral as claimed in claim 4, including the step of validating a security's acceptability by its depository, class, tenor and rating in said acceptability table.

6. The method of monitoring collateral as claimed in claim 1, wherein said account specific parameters include threshold and minimum call information for an account.

7. The method of monitoring collateral as claimed in claim 1, wherein said predetermined account tables include a security haircut table and a cross-currency haircut table, and the step of calculating an optimal haircut includes a step of multiplying a plurality of values from a security haircut table by a plurality of values from a cross-currency haircut table and receiving a plurality of results and creating an optimization list of the plurality of results and currency security class pairs sorted in descending order.

8. The method of monitoring collateral as claimed in claim 7, wherein the step of calculating a market value for each collateral position includes the steps of calculating a local market value for each collateral position and proposed collateral position, and converting the local market value to a base market value in a predetermined base currency.

9. The method of monitoring collateral as claimed in claim 8, including the step of providing an indicia of the local currency along with the base market value.

10. The method of monitoring collateral as claimed in claim 9, wherein the step of applying the optimal haircut to the market value is applied to the base market value to obtain an adjusted base collateral value.

11. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables including a security haircut table and a cross-currency haircut table;

calculating an optimal haircut using at least one of said predetermined tables including multiplying a plurality of values from the security haircut table by a plurality of values from the cross-currency haircut table and receiving a plurality of results and creating an optimization list of the plurality of results and currency security class pairs sorted in descending order;

calculating a market value for each collateral position using at least one of said predetermined tables including calculating a local market value for each collateral position and proposed collateral position, and converting the local market value to a base market value in a predetermined base currency;

providing an indicia of the local currency along with the base market value;

applying the optimal haircut to the base market value for each collateral position to obtain an adjusted base collateral value;

retrieving collateral requirements from at least one of said predetermined account tables for an account;

matching the adjusted base collateral value to collateral requirement on a country-by-country basis in the base currency;

matching unmatched collateral requirements to unmatched collateral; and acting in response thereto.

12. The method of monitoring collateral as claimed in claim 11, wherein the unmatched collateral requirements are matched to the unmatched collateral by finding the highest currency/security class pair in the remainders and working down the optimization list.

13. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables;

calculating an optimal haircut using at least one of said predetermined tables;

calculating a market value for each collateral position using at least one of said predetermined tables including determining whether a collateral position date and a price date are valid, and if invalid setting the collateral position value to zero;

applying the optimal haircut to the market value for each collateral position to obtain an adjusted collateral value;

retrieving collateral requirements from at least one of said predetermined account tables for an account;

matching the adjusted collateral value to the collateral requirements on a country-by-country basis;

matching unmatched collateral requirements to unmatched collateral; and acting in response thereto.

14. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables;

calculating an optimal haircut using at least one of said predetermined tables;

calculating a market value for each collateral position using at least one of said predetermined tables including checking a price multiplier flag and if the price multiplier flag equals zero, then local market value=units*extender*price, and if the price multiplier flag equals one, then local market value=units*extender/price;

applying the optimal haircut to the market value for each collateral position to obtain an adjusted collateral value;

retrieving collateral requirements from at least one of said predetermined account tables for an account;

matching the adjusted collateral value to the collateral requirements on a country-by-country basis;

matching unmatched collateral requirements to unmatched collateral; and acting in response thereto.

15. The method of monitoring collateral as claimed in claim 14, further including the step of adding accrued interest to the local market value to obtain an adjusted local market value.

16. The method of monitoring collateral as claimed in claim 15, further including the step of dividing adjusted local market value by base currency exchange rate to obtain base market value.

17. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables;

calculating an optimal haircut using at least one of said predetermined tables including:

subtracting a system date from the position's effective maturity date;

retrieving a record in one of said tables containing the position's security, class, rating and maturity;

calculating the position's margin contribution as follows:

when margin type indicator=P, contribution=base market value*(1-margin);

when margin type indicator=E;

contribution=(100*base market value/margin);

calculating a market value for each collateral position using at least one of said predetermined tables;

applying the optimal haircut to the market value for each collateral position to obtain an adjusted collateral value;

retrieving collateral requirements from at least one of said predetermined account tables for an account;

matching the adjusted collateral value to the collateral requirements on a country-by-country basis;

matching unmatched collateral requirements to unmatched collateral; and acting in response thereto.

18. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables including a security haircut table and a cross-currency haircut table;

calculating an optimal haircut by multiplying a plurality of values from the cross-currency haircut table by the security haircut table and receiving a plurality of results and creating an optimization list of the plurality of results and currency security class pairs sorted in descending order;

calculating a local market value for each collateral position and converting the local market value to a base market value;

applying the optimal haircut to the base market value for each collateral position to obtain an adjusted collateral value;

retrieving collateral requirements from at least one of the predetermined account tables for an account;

matching the adjusted collateral value to the collateral requirements on a country-by-country basis in said base currency;

matching unmatched requirements to unmatched collateral in the base currency by finding the highest currency/security class pair in the unmatched collateral and working down the optimization list; and acting in response thereto.

19. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables;

calculating an optimal haircut by multiplying a plurality of values from a first of said predetermined account tables by a plurality of values from a second of said predetermined account tables and receiving a plurality of results and creating an optimization list of the plurality of results and currency security class pairs sorted in descending order;

calculating a local market value for each collateral position and converting the local market value to a base market value including determining whether a collateral position date and a price date are valid, and if invalid setting the collateral position value to zero;

applying the optimal haircut to the base market value for each collateral position to obtain an adjusted collateral value;

retrieving collateral requirements from at least one of the predetermined account tables for an account;

matching the adjusted collateral value to the collateral requirements on a country-by-country basis in said base currency;

matching unmatched requirements to unmatched collateral in the base currency by finding the highest currency/security class pair in the unmatched collateral and working down the optimization list; and acting in response thereto.

20. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables;

calculating an optimal haircut by multiplying a plurality of values from a first of said predetermined account tables by a plurality of values from a second of said predetermined account tables and receiving a plurality of results and creating an optimization list of the plurality of results and currency security class pairs sorted in descending order;

calculating a local market value for each collateral position and converting the local market value to a base market value including checking a price multiplier flag and if the price multiplier flag equals zero, then local marketvalue=units*extender*price, and if the price multiplier flag equals one, then local market value= units*extender/price;

applying the optimal haircut to the base market value for each collateral position to obtain an adjusted collateral value;

retrieving collateral requirements from at least one of the predetermined account tables for an account;

matching the adjusted collateral value to the collateral requirements on a country-by-country basis in said base currency;

matching unmatched requirements to unmatched collateral in the base currency by finding the highest currency/security class pair in the unmatched collateral and working down the optimization list; and acting in response thereto.

21. The method of monitoring collateral as claimed in claim 20, further including the step of adding accrued interest to the local market value to obtain an adjusted local market value.

22. The method of monitoring collateral as claimed in claim 21, further including the step of dividing adjusted local market value by base currency exchange rate to obtain base market value.

23. A method of monitoring collateral positions in an account using a computer system for accessing a plurality of tables from a database comprising the steps of:

receiving a transaction message including a transaction type and an account identification;

validating account and collateral existence within the system;

retrieving account specific parameters from predetermined account tables;

calculating an optimal haircut by multiplying a plurality of values from a first of said predetermined account tables by a plurality of values from a second of said predetermined account tables and receiving a plurality of results and creating an optimization list of the plurality of results and currency security class pairs sorted in descending order including:

subtracting a system date from the position's effective maturity date;

retrieving a record in one of said tables containing the position's security, class, rating and maturity;

calculating the position's margin contribution as follows:

when margin type indicator=P, contribution=base market value*(1-margin);

when margin type indicator=E;

contribution=(100*base market value/margin);

calculating a local market value for each collateral position and converting the local market value to a base market value;

applying the optimal haircut to the base market value for each collateral position to obtain an adjusted collateral value;

retrieving collateral requirements from at least one of the predetermined account tables for an account;

matching the adjusted collateral value to the collateral requirements on a country-by-country basis in said base currency;

matching unmatched requirements to unmatched collateral in the base currency by finding the highest currency/security class pair in the unmatched collateral and working down the optimization list; and acting in response thereto.

24. A computerized system for monitoring collateral positions in an account comprising;

an input device which receives transaction messages including a transaction type and an account identification;

a database including a plurality of tables defining processing rules for each account and collateral type including at least a security and cross-currency haircut table and collateral requirements; and a collateral processing unit for processing transactions;

said collateral processing unit accessing said database and validating account and collateral existence within the system, accessing the haircut tables within said database and calculating an optimal haircut including multiplying a plurality of values from the cross-currency haircut table by the security haircut table and receiving a plurality of results and creating an optimization list of the plurality of results and currency security class pairs sorted in descending order, calculating a market value for each collateral position, said collateral position having a market value, applying the optimal haircut to the market value for each collateral position to obtain an adjusted collateral value, retrieving collateral requirements from said database for the account, matching the adjusted collateral value to the collateral requirements on a country-by-country basis, matching unmatched collateral requirements to the unmatched collateral, and taking action in response thereto.

25. The computerized system of monitoring collateral as claimed in claim 24, wherein said collateral processing unit retrieves confirmed and unconfirmed account positions affecting available collateral for the account.

26. The computerized system of monitoring collateral as claimed in claim 25, wherein said database includes an acceptability table including entries for each security including a depository, a class, a tenor and a rating.

27. A computerized system for monitoring collateral positions in an account comprising;

an input device which receives transaction messages including a transaction type and an account identification;

a database including a plurality of tables defining processing rules for each account and collateral type including at least an acceptability table including entries for each security including a depository, a class, a tenor and a rating, a haircut table and collateral requirements; and a collateral processing unit for processing transactions;

said collateral processing unit accessing said database and validating account and collateral existence within the system, retrieving confirmed and unconfirmed account positions affecting available collateral for the account, validating a security's acceptability by its depository, class, tenor and rating in said acceptability table, accessing a haircut table within said database and calculating an optimal haircut, calculating a market value for each collateral position, said collateral position having a market value, applying the optimal haircut to the market value for each collateral position to obtain an adjusted collateral value, retrieving collateral requirements from said database for the account, matching the adjusted collateral value to the collateral requirements on a country-by-country basis, matching unmatched collateral requirements to the unmatched collateral, and taking action in response thereto.

28. The computerized system of monitoring collateral as claimed in claim 24, wherein said collateral processing unit accesses one of said plurality of tables to retrieve threshold and minimum call information for the account.

29. The computerized system of monitoring collateral as claimed in claim 24, wherein said collateral processing unit calculates the optimal haircut by multiplying a plurality of values from a first of said plurality of tables from the database by a plurality of values from a second of said plurality of tables from the database and receives a plurality of results, and creating an optimization list of the plurality of results and currency security class pairs sorted in descending order.

30. A computerized system for monitoring collateral positions in an account comprising;

an input device which receives transaction messages including a transaction type and an account identification;

a database including a plurality of tables defining processing rules for each account and collateral type including at least a haircut table and collateral requirements; and a collateral processing unit for processing transactions;

said collateral processing unit accessing said database and validating account and collateral existence within the system, accessing a haircut table within said database and calculating an optimal haircut by multiplying a plurality of values from a first of said plurality of tables from the database by a plurality of values from a second of said plurality of tables from the database and receives a plurality of results, and creating an optimization list of the plurality of results and currency security class pairs sorted in descending order, calculating a market value for each collateral position by calculating a local market value for each collateral position and proposed collateral position, and converting the local market value to a base value in a predetermined base currency, said collateral position having a market value, applying the optimal haircut to the market value for each collateral position to obtain an adjusted collateral value, retrieving collateral requirements from said database for the account, matching the adjusted collateral value to the collateral requirements on a country-by-country basis, matching unmatched collateral requirements to the unmatched collateral, and taking action in response thereto.

31. The computerized system of monitoring collateral as claimed in claim 30, wherein said collateral processing unit provides an indicia of the local currency along with the base market value.

32. The computerized system of monitoring collateral as claimed in claim 31, wherein the haircut is applied to the base market value of the collateral to obtain an adjusted base collateral value.

33. The computerized system of monitoring collateral as claimed in claim 32, wherein said adjusted collateral value is matched to the collateral requirement on a country-by-country basis in the base currency.

34. The computerized system of monitoring collateral as claimed in claim 32, wherein the unmatched collateral requirements are matched to the unmatched collateral by finding the highest currency/security class pair in the remainders and working down the optimization list.

* * * * *